(12) United States Patent  
Heim et al.

(10) Patent No.: US 8,007,179 B2
(45) Date of Patent: Aug. 30, 2011

(54) WHEEL BEARING ARRANGEMENT COMPRISING A RADIAL-FLANGE-SIDE ENCODER

(75) Inventors: Jens Heim, Bergrheinfeld (DE); Peter Niebling, Bad Kissingen (DE); Gottfried Ruoff, Niederwerrn (DE); Darius Dlugai, Schweinfurt (DE); Christian Mock, Bergrheinfeld (DE)

(73) Assignee: Schaeffler KG, Herzogenaurach (DE)

( * ) Notice: Subject to any disclaimer, the term of this patent is extended or adjusted under 35 U.S.C. 154(b) by 887 days.

(21) Appl. No.: 11/574,990

(22) PCT Filed: Aug. 12, 2005

(86) PCT No.: PCT/DE2005/001427
§ 371 (c)(1),
(2), (4) Date: Apr. 11, 2007

(87) PCT Pub. No.: WO2006/026950
PCT Pub. Date: Mar. 16, 2006

(65) Prior Publication Data
US 2008/0031556 A1    Feb. 7, 2008

(30) Foreign Application Priority Data
Sep. 11, 2004  (DE) .......................... 10 2004 044 118

(51) Int. Cl.
*F16C 32/00*  (2006.01)
*F16C 41/04*  (2006.01)

(52) U.S. Cl. ...................................... 384/448; 384/544

(58) Field of Classification Search .................. 384/448, 384/543, 544, 586; 324/173, 174, 207.22, 324/207.55; 301/105.1; 277/349, 423, 562, 277/566, 565, 571; 111/448, 543, 544, 586
See application file for complete search history.

(56) References Cited

U.S. PATENT DOCUMENTS

| 4,864,231 | A |   | 9/1989 | Okumura et al. | |
|---|---|---|---|---|---|
| 5,080,500 | A | * | 1/1992 | Hilby et al. | 384/448 |
| 5,127,747 | A | * | 7/1992 | Hilby et al. | 384/448 |
| 6,190,051 | B1 | * | 2/2001 | Angelo et al. | 384/448 |
| 6,414,479 | B1 | * | 7/2002 | LaCroix et al. | 324/173 |
| 6,485,188 | B1 | * | 11/2002 | Dougherty | 384/589 |
| 6,637,754 | B1 | * | 10/2003 | Ohtsuki et al. | 277/549 |
| 6,906,509 | B2 | * | 6/2005 | Tomioka | 324/174 |
| 6,974,136 | B2 | * | 12/2005 | Vignotto et al. | 277/549 |
| 7,034,521 | B2 | * | 4/2006 | Sentoku et al. | 324/174 |
| 7,077,574 | B2 | * | 7/2006 | Niebling et al. | 384/448 |
| 2005/0047692 | A1 | * | 3/2005 | Niebling et al. | 384/448 |

FOREIGN PATENT DOCUMENTS

| DE | 38 19 619 A | 2/1989 |
|---|---|---|
| EP | 0 144 240 A | 8/2004 |
| JP | 2004 045370 A | 2/2004 |

* cited by examiner

*Primary Examiner* — James Pilkington
(74) *Attorney, Agent, or Firm* — Lucas & Mercanti, LLP

(57) ABSTRACT

The invention relates to a wheel bearing arrangement which enables a hub to be mounted in at least one non-rotating external ring such that it can rotate about the rotational axis of the hub. The wheel bearing arrangement comprises at least one sealing arrangement and one encoder and the sealing arrangement is secured to the hub side on the side of the wheel bearing arrangement whereon a radial flange extends in a radial manner from the hub. The encoder is actively connected to the sealing arrangement.

22 Claims, 8 Drawing Sheets

WHEEL BEARING ARRANGEMENT COMPRISING A RADIAL-FLANGE-SIDE ENCODER

FIELD OF THE INVENTION

The invention relates to a wheel bearing arrangement comprising a hub mounted rotatably about the rotational axis of the hub in at least one non-rotating outer ring, the wheel bearing having an encoder, and the encoder being fixed to that side of the wheel bearing arrangement at the hub side, from which side a radial flange leads radially away from the hub and the encoder being operatively connected to the sealing arrangement.

BACKGROUND OF THE INVENTION

A wheel bearing arrangement of this type is described in U.S. Pat. No. 4,864,231. The vehicle wheel is, as a rule, fastened to the radial flange of the hub by way of bolts. In this case, the radial flange is configured integrally with the hub.

The wheel bearing is as a rule a roller bearing having two or more rows of rolling bodies. Inner rings having the raceways for the rows are seated optionally on the hub. At least one raceway of two or more of the rows of rolling bodies is optionally incorporated directly into the material of the hub. The wheel bearing has one or more outer rings, on which the inner raceways for the rows are formed. The outer rings are either seated in the wheel support, or the outer ring is, as in the underlying prior art, the wheel support itself. The wheel support is provided with a flange, which has, for example, a plurality of fastening holes, for fastening the wheel support on the vehicle side. The outer ring is accordingly fixed in terms of rotation. The hub and therefore the vehicle wheel are mounted in the wheel bearing so as to rotate with respect to the wheel support.

The wheel bearing is, as a rule, sealed with two seals against environmental influences from the outside. One of the seals protects the wheel bearing as well as the encoder and at the same time has a sealing operative connection to the encoder. To this end, the seal has a sealing element in the form of a covering plate which is seated on the outer ring. One sealing lip on the covering plate bears sealingly against the encoder.

The sensor system is often arranged on the side of the radial flange, as the installation space on the vehicle side between the articulation bell and the wheel carrier is small for passing through the connecting lines of the sensor system and as the sensor system is exposed sometimes, to extreme contaminations at this location. The expenditure for sealing the wheel bearing and for simultaneously protecting the sensor system is therefore relatively high. The connecting lines are endangered by mud or ice accumulations on the side of the articulation bell.

However, in contrast, little installation space is available on the side of the vehicle wheel for the sensor system, for the components seal, encoder and sensor/sensors per se. In addition, the heads/threaded ends of the bolts which protrude axially out of the radial flange for fastening the wheel project in a disruptive manner into the installation space and also influence the signals of the sensor system by interfering signals.

The encoder is seated directly on the hub by means of a press fit and rotates with the latter relative to the sensor. In the arrangement according to U.S. Pat. No. 4,864,231, the sensor which belongs to the sensor system is held in a hole of the wheel carrier and protrudes through the hole into the interior of the wheel bearing. The seat of the sensor in the outer ring is to be manufactured and sealed separately and therefore causes additional costs. During the mounting of the sensor, and also during repair and maintenance, there is the risk that dirt particles pass into the interior of the roller bearing during insertion of the sensor. Those sealing lips of known sealing arrangements which lie on the outside of wheel bearing arrangements are, as a rule, directly exposed to environmental influences and fail prematurely. Dirt and moisture pass under the seal and penetrate into the roller bearing.

SUMMARY OF THE INVENTION

It is therefore the object of the invention to provide a wheel bearing arrangement, with which the above-described disadvantages are avoided. In particular, a simple and inexpensive sealing arrangement having an integrated encoder is to be provided. Furthermore, sufficient installation space for the sealing arrangement and the encoder is to be provided on the wheel flange side.

This object is achieved in that:
  the wheel bearing arrangement of the invention has a gap seal on that side of the wheel bearing which faces the radial flange, there being an operative connection in the gap seal between the encoder and a sealing element. The gap seal is formed by at least one sealing gap which extends around the rotational axis between the encoder and a sealing element of the sealing arrangement,
or optionally in that:
  the encoder which is fixed on the huh side surrounds contact-free an annular section of the outer ring in a circumferential manner radially on the outside,
  or as an alternative:
  by a combination of the preceding features.

Additional installation space for the wheel-side sealing of the wheel bearing and for the sensor system is provided by a wheel bearing arrangement of this type. The encoder is sufficiently protected by the seal. The sensor is arranged in a spatially separate manner from the interior of the wheel bearing. The bearing arrangement and, particularly, the sealing arrangement can be manufactured inexpensively, in particular, when the covering plate and the sensor with the carrier are cold-formed sheet metal parts. The encoder and the sensor are arranged far enough away from the interfering influences of the wheel bolts on the sensor signals. The active surface of the encoder (the encoding section which communicates with the sensor) can be of generous configuration in a manner which is free and independent of the dimensions of the axial installation space between the end side of the wheel bearing and the radial flange. The quality of the signals is improved. The axial installation space therefore can be used for the design of the sealing arrangement according to the invention with sufficient sealing action.

The invention is suitable for the use of all conceivable magnetized encoders (with changing polarity), such as pulse generators having magnetized particles in elastomers, or for the use of nonmagnetized encoders, such as pulse generator rings made from sheet metal. The protective sleeve, optionally also made from plastic, is preferably a protective plate made from nonferromagnetic material. The encoder is protected against stone chipping or other hard particles. Spray water and ferromagnetic particles from the surroundings are kept away by the protective sleeve.

The dimension of the gap of the gap seal is smaller than or at most equal to one millimeter. The corresponding orientation of the protective sleeve and the position of the sealing gap ensure that fluid which has penetrated via the gap into the interior of the seal drips out of the gap or is conveyed through the gap to the outside during operation as a result of centrifugal force on the rotating encoder.

BRIEF DESCRIPTION OF THE DRAWINGS

Refinements and exemplary embodiments of the invention are explained in greater detail in the following text.

FIG. 1 shows perspective view of one exemplary embodiment of a wheel bearing arrangement which is sectioned along the rotational axis 1a;

DETAILED DESCRIPTION OF THE INVENTION

Figure 1:
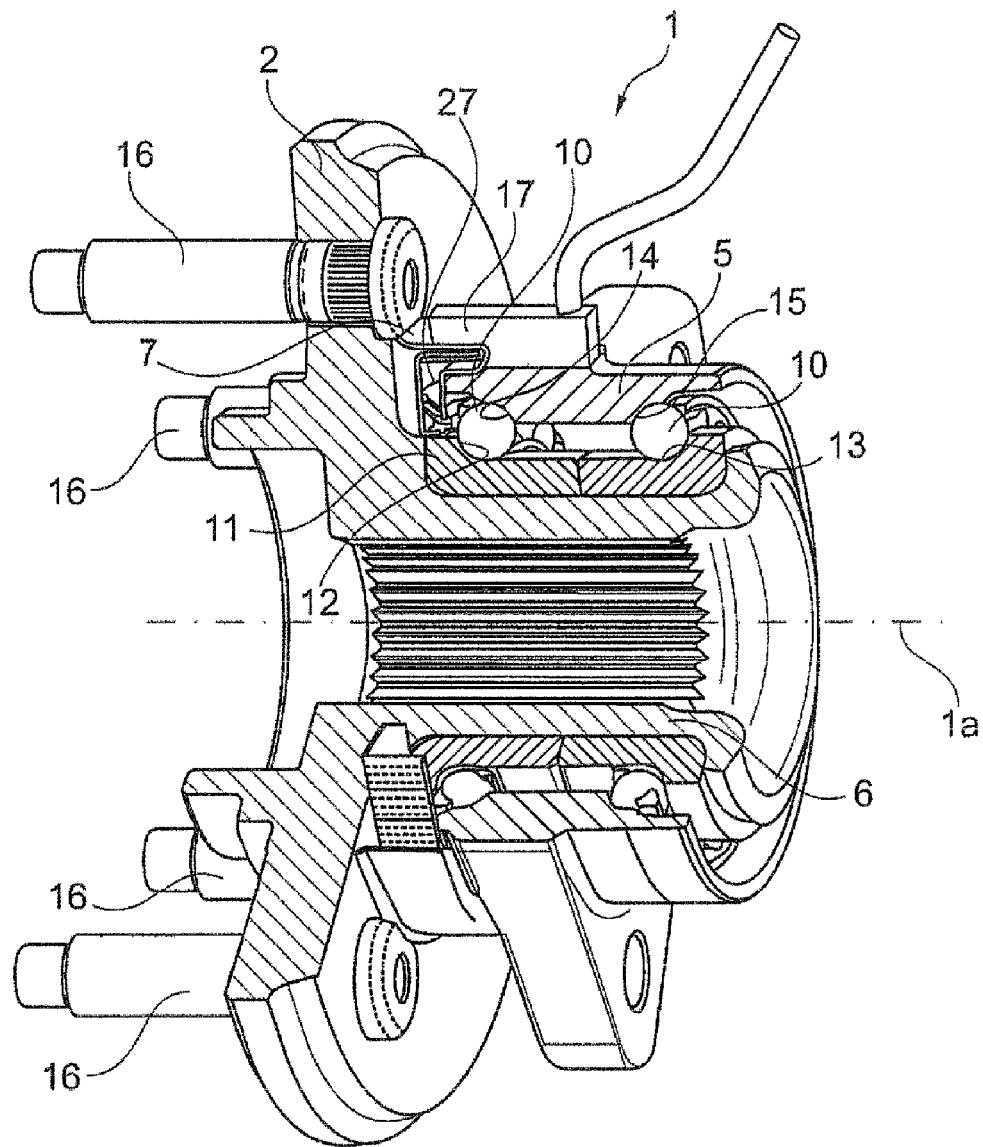
Figure 2:
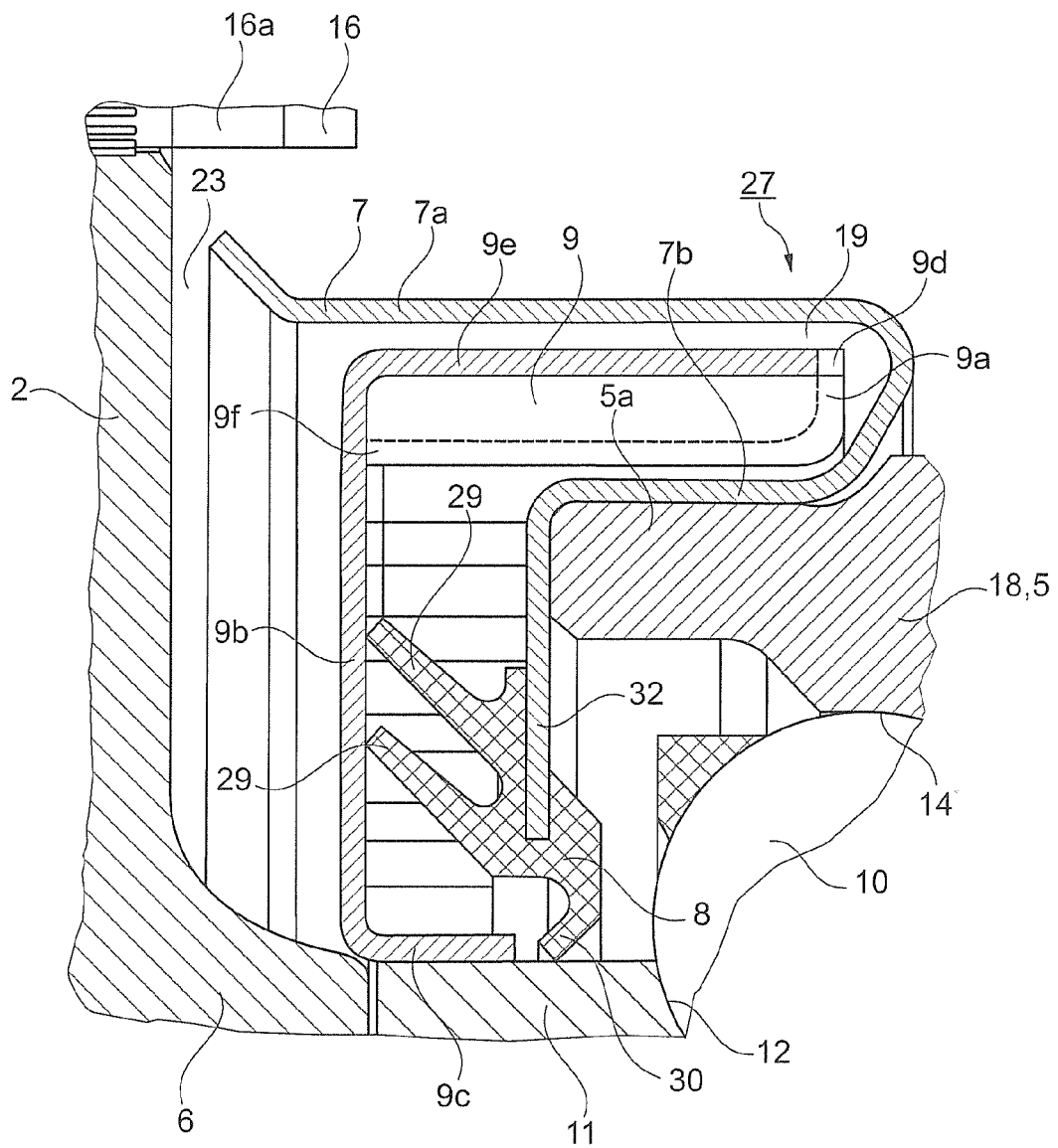
FIG. 2 shows a partial view of a radial-flange-side sealing arrangement of the wheel hearing arrangement which is sectioned along the rotational axis.

FIGS. 1 and 2 show a wheel bearing arrangement 1 with a radial flange 2 and a wheel support 5. The radial flange 2 is configured integrally with a hub 6 and is mounted in the wheel support 5 such that it can rotate about the rotational axis 1a. The wheel bearing is formed from two rows of rolling bodies 10, an inner ring 11, optionally two inner rings, two raceways 12 and 13 and an outer ring 18 which has two raceways 14 and 15 in the form of the wheel support 5. The raceway 12 is formed on the inner ring 11 and the other raceway 13 is formed directly on the hub 6. The hub 6 with the radial flange 2 is mounted rotatably in the wheel support 5 via the two rows of rolling bodies 10. A vehicle wheel (not shown) is fastened to the radial flange 2 by way of the wheel bolts 16.

Furthermore, the wheel bearing arrangement 1 has a sealing arrangement 27 with a protective sleeve 7 from a nonferromagnetic sheet, with an elastic seal 8 and with an encoder 9. At least one sensor 17 lies opposite the encoder 9. The encoder 9 and the sensor 17 are separated from one another by the protective sleeve 7.

Figure 1A:
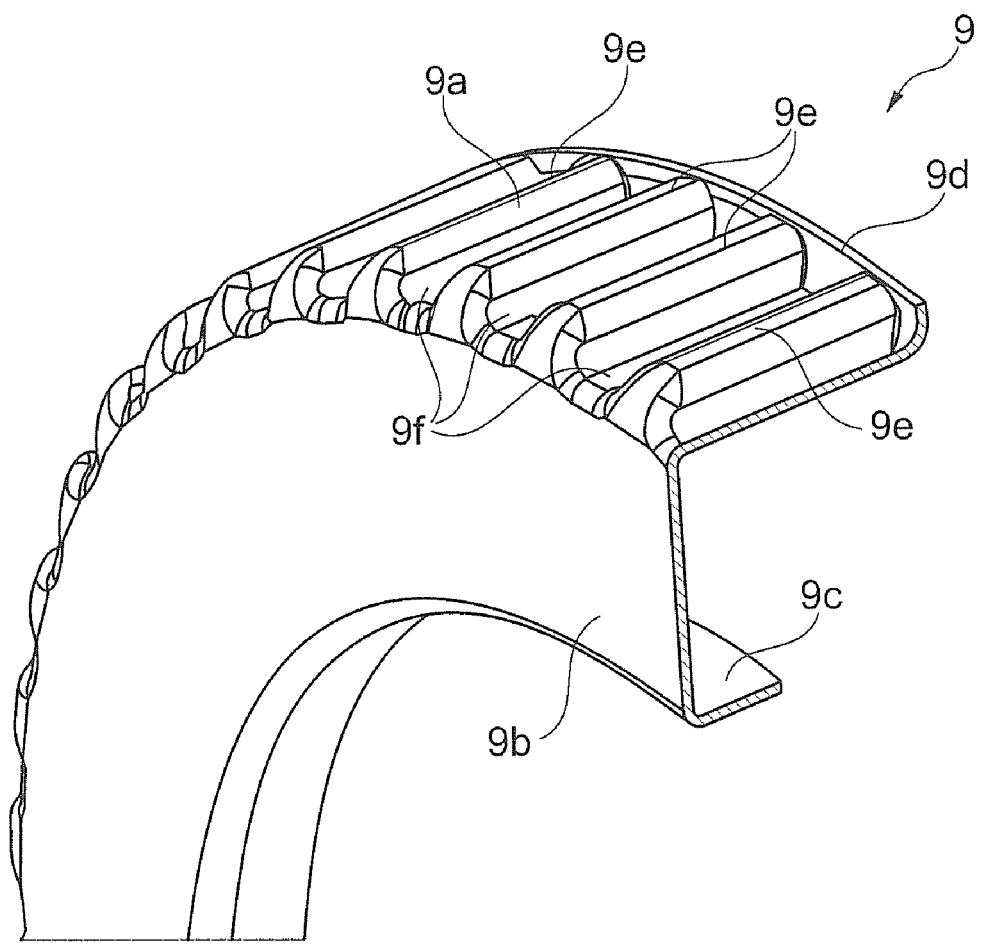
FIG. 1a shows a segment of an encoder of the wheel-flange-side sealing arrangement from the wheel bearing arrangement according to FIG. 1.

The encoder 9 is shown partially as an individual part in FIG. 1a and is a component which is cold-formed from sheet metal comprising a support 9b with a collar 9c and the encoding section 9a which communicates with the sensor 17 for signal generation. The encoding section 9a is constructed for alternating signals, in this case wave-shaped, in such a way that peaks 9e alternate with trough bottoms 9f in the circumferential direction and with an identical pitch with respect to one another.

Figure 3:
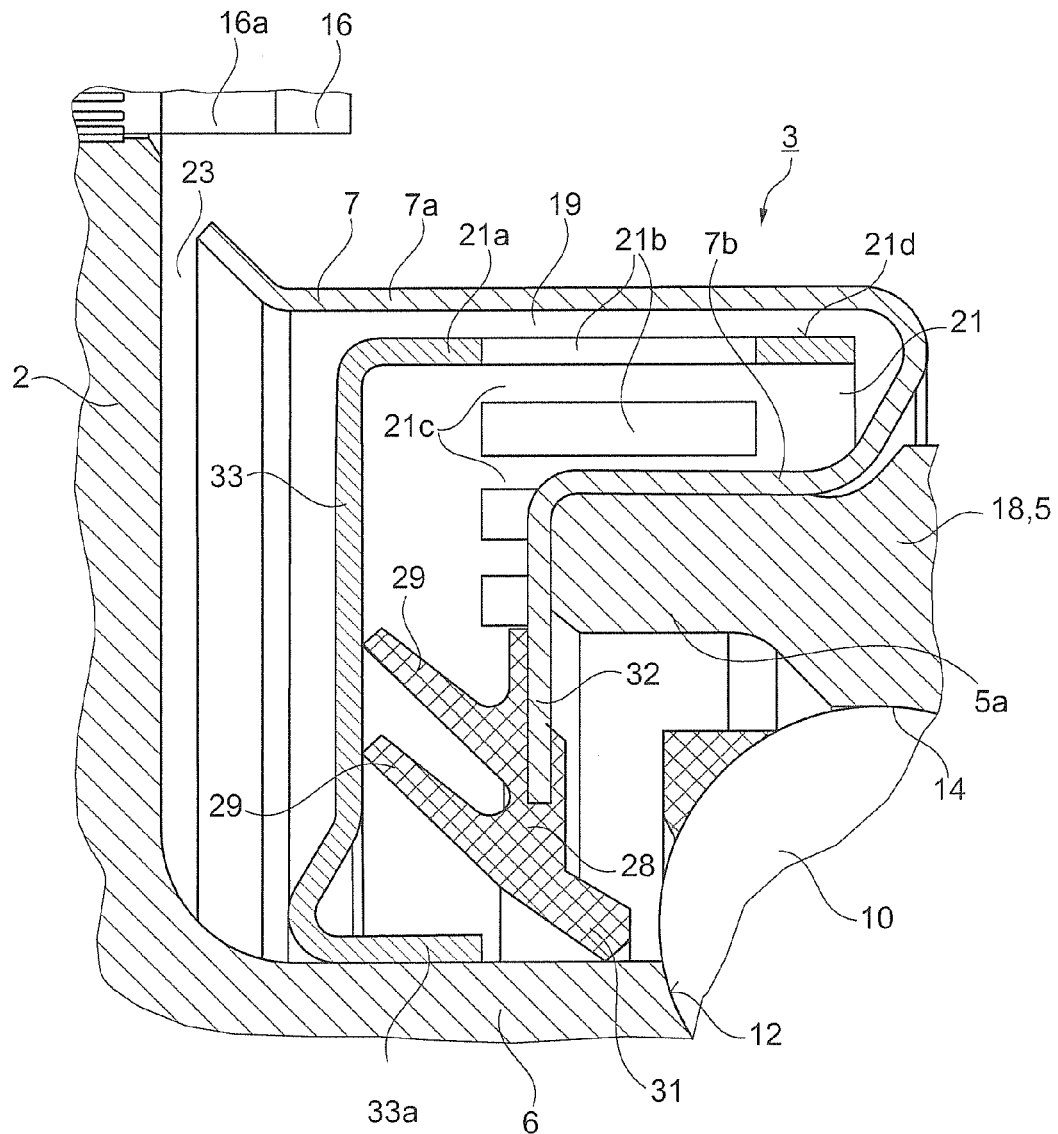
FIGS. 3 and 4 show radial-flange-side sealing arrangements partially in illustrations sectioned along the rotational axis.

It is also conceivable that, as shown in FIG. 3, the sealing arrangement 3 has an encoder 21, the encoding section 21a of which, which communicates with the sensor 17, is a hollow-cylindrical section having window-like radial apertures 21b. The apertures 21b are separated from one another in the circumferential direction by webs 21c of identical dimensions and are arranged with a uniform pitch with respect to one another.

Figure 4:
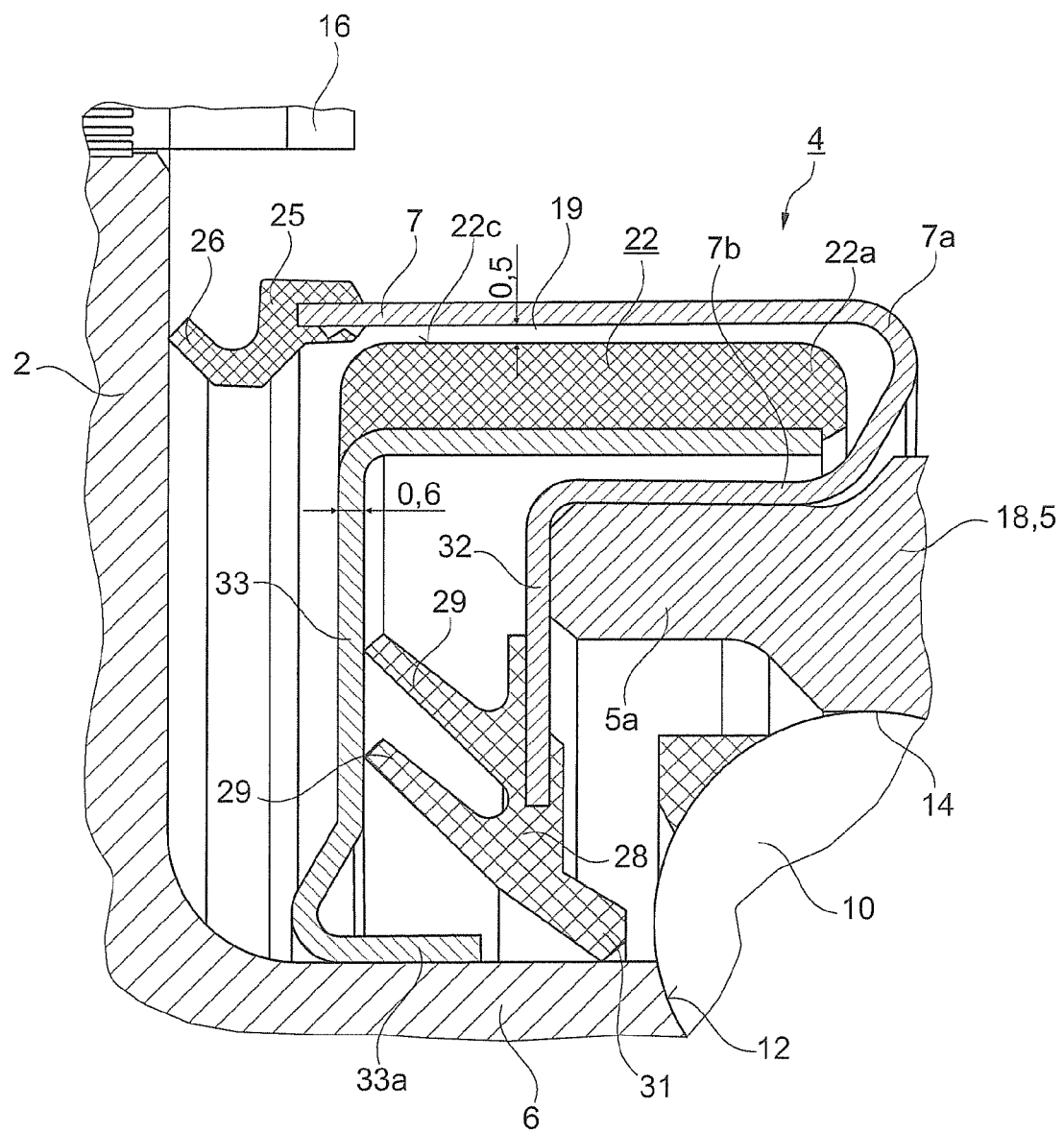

As an alternative, FIG. 4 shows an encoder 22, the encoding section 22a of which, which communicates with the sensor 17 for signal generation, is substantially a body made from elastomer with multipolar magnetized additives.

The encoder 9 is fixed on the inner ring 11 by a press fit of the collar 9c on the support 9b and is therefore fixed on the hub side. The encoding section 9a of the encoder 9 which is relevant for the signal generation of the sensor 17 extends, from the support 9b, axially away from the radial flange 2 in the direction of the wheel support 5 and reaches over the latter at the annular section 5a. The encoder 9 surrounds the annular section 5a of the outer ring 18 or of the support 5 without contact, by way of the communicating encoding section 9a.

In this case, the projections 16a of the wheel bolts 16 are the heads of the wheel bolts 16 and they protrude axially from the radial flange 2. The communicating encoding section 9a is spaced radially apart from the projections and is not protruded beyond axially. The radial spacing of the projections from the hub 6 is greater than the radial spacing of the radially outermost body edge of the encoding section 9a from the hub 6.

The protective sleeve 7 is cup-shaped, cold-formed from sheet metal and nonferromagnetic. A first hollow-cylindrical section 7a of the protective sleeve 7 which lies radially on the outside covers the encoder 9 from the outside against environmental influences. A second hollow-cylindrical section 7b which is formed integrally with the first section 7a is seated fixedly on the annular section 5a of the outer ring 18, with the result that the protective sleeve 7 is fixed in terms of rotation together with the outer ring 18 during the operation of the wheel bearing, the encoder 9 extends axially along an entire length of the second hollow-cylindrical section 7b. A gap seal. A gap seal 20 is formed by a sealing gap 19 between the first section 7a which functions as a sealing element and the circumferentially extending edge 9d on the axial end of the encoder 9 (FIG. 1a, FIG. 2), or between the outer contour 21d of the interrupted circumferential face and the first section 7a (FIG. 3) and between the outer contour 22b of the cylindrical circumferential face of the elastomer body and the first section 7a (FIG. 4). The radial dimension of the gap seal, which is formed by the sealing gap 19, is less than 1 mm and preferably 0.5 mm.

The sealing arrangements 3 and 27 optionally have a further gap seal 21 with a sealing gap 23 which is formed axially between the protective sleeve 7 and the radial flange 2. In this case, an elastic seal 25 is fixed with a sealing lip 26 on the protective sleeve 7 of the sealing arrangement 4 according to FIG. 4. The sealing lip 26 bears sealingly against the radial flange 2.

In the operative connection in the sequence from the outside to the inside, the gap seal 20 follows the gap seal 21 or the seal 25 on the bearing side. Accordingly, in this sequence, the gap seal 20 is followed by the seal 8 in the sealing arrangement 27 according to FIGS. 1 and 2 and by the seal 28 in the sealing arrangements 3 and 4. The seals 8 and 28 have in each case two of the sealing lips 29 and one sealing lip 30 or 31. The seals 8, 28 are fixed in each case on one disk section 32. The disk section 32 is configured integrally with the protective sleeve 7. The sealing lips 29 are prestressed axially against the support 9b or 33 of the respective encoder 9 or 21, 22. The sealing lip 30 of the sealing arrangement 27 is prestressed radially against the inner ring 11 and seals the wheel bearing to the outside. The sealing lip 31 bears sealingly, in a radial and direct manner, against the hub 6 and seals the latter to the inside.

The encoder 21, 22 is fixed directly on the hub 6 by a press fit of the collar 33a on the support 33. The encoding section 21a or 22a of the encoder 21, 22 which is relevant for the signal generation of the sensor 17 extends from the support 33 axially away from the radial flange 2 in the direction of the wheel support 5 and reaches over the latter at the annular section 5a. The encoder 21 or 22 surrounds the annular section 5a of the outer ring 18 or the support 5 without contact, by way of the communicating encoding section 21a or 22a.

Figure 5:
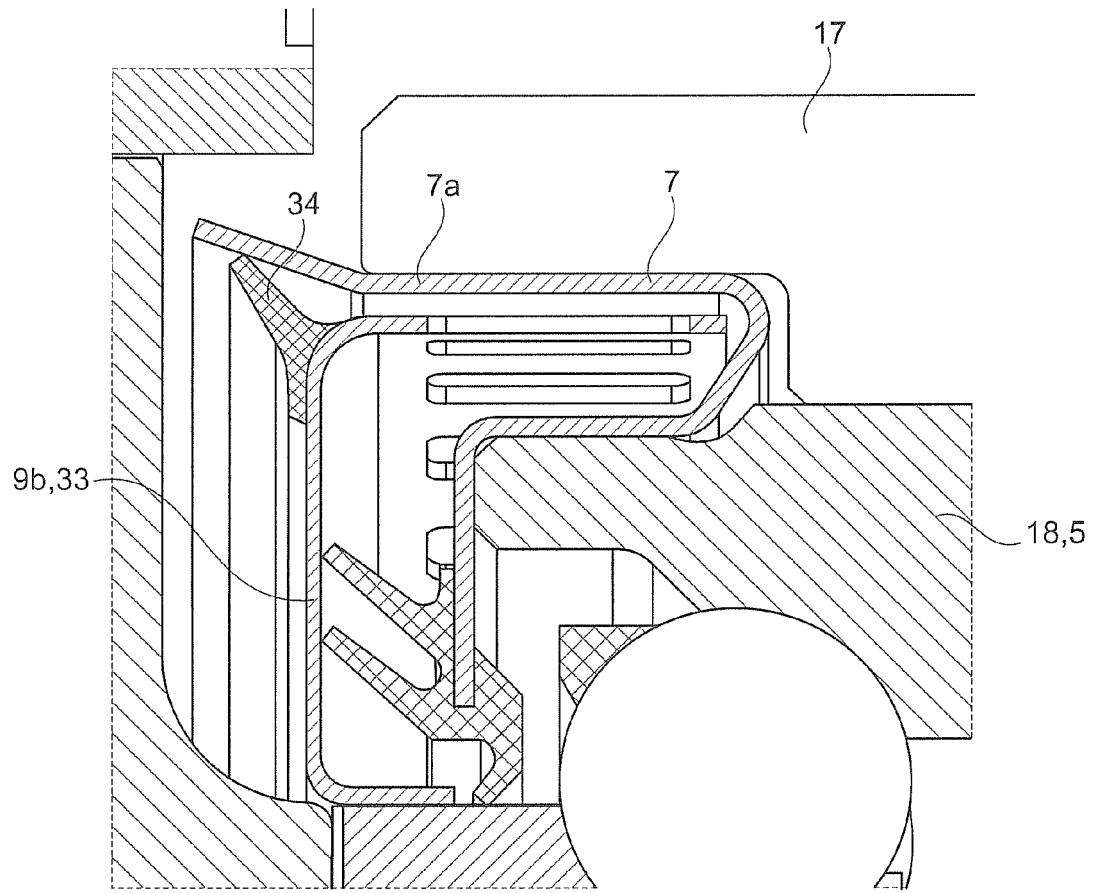
FIGS. 5-7 show alternative sealing arrangements in the wheel bearing arrangement.
Figure 6:
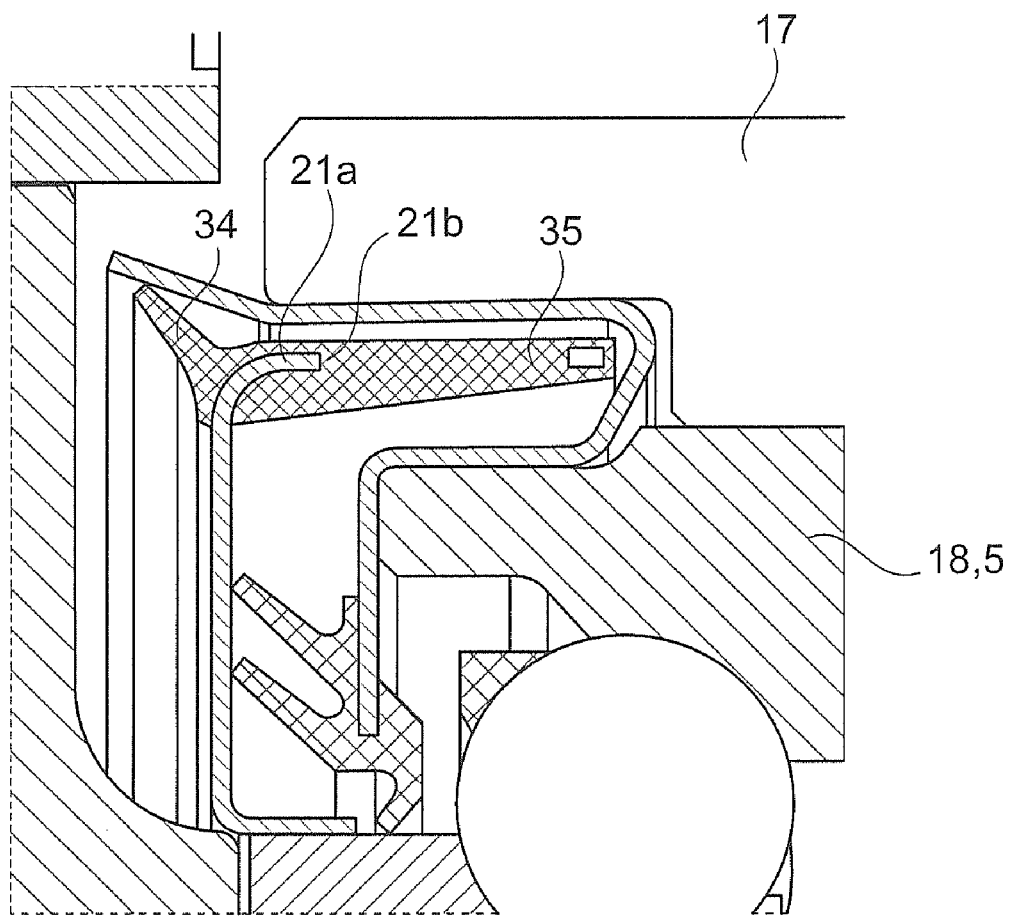
Figure 7:
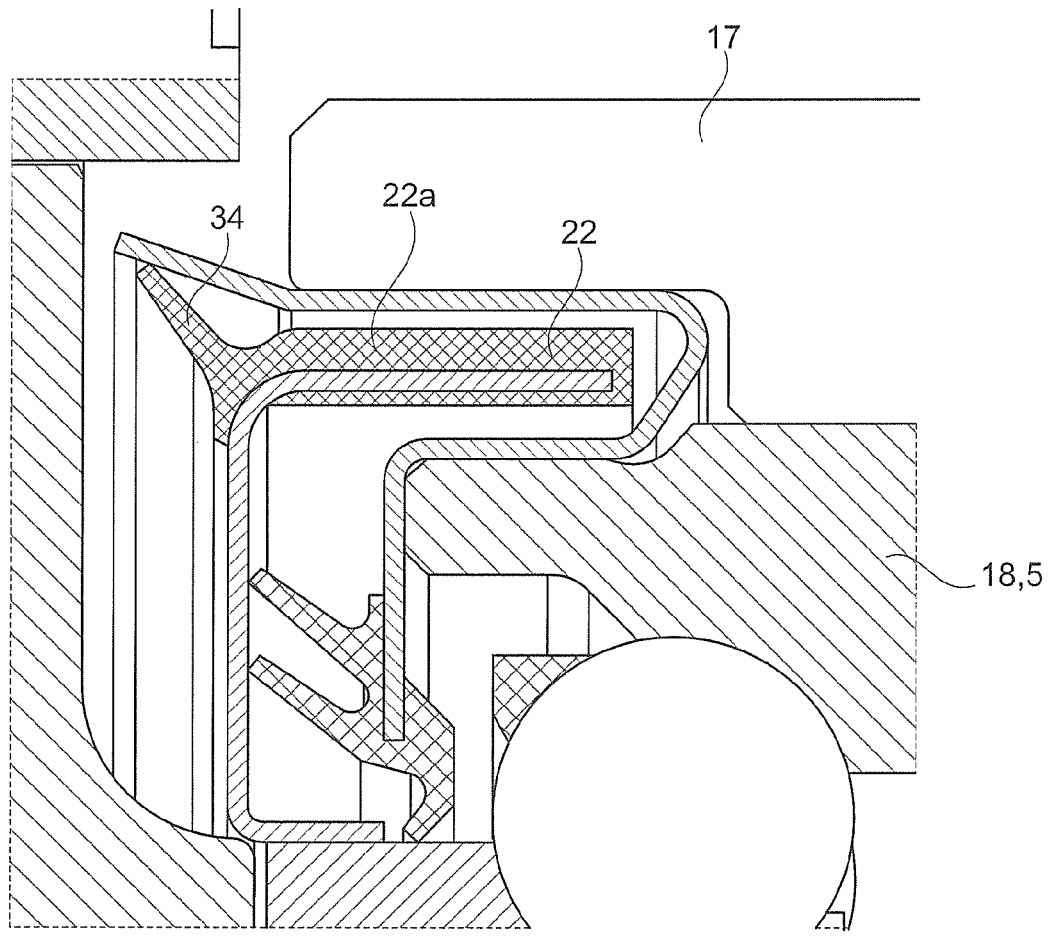

FIGS. 5 to 7 show alternative sealing arrangements in the wheel bearing arrangement 1, having a preliminary seal with respect to the gap seal. The preliminary seal is formed by at least one sealing lip 34 on modifications of the encoders 9, 21 and 22. The sealing lip 34 bears sealingly against the protective sleeve 7. In the sealing arrangement according to FIG. 5, the sealing lip is attached separately to the support 9b or 33 by vulcanization or the like. In the refinement according to FIG. 6, the sealing lip 34 is configured integrally with a body 35, the elastomer material of which also fills the apertures 21b of the encoding section 21a. FIG. 7 shows an encoder 22 made from elastomer and with magnetized particles, in which the sealing lip 34 is formed from the elastomer integrally with the encoding section 22a.

LIST OF DESIGNATIONS

1 Wheel bearing arrangement
1a Rotational axis
2 Radial flange
3 Sealing arrangement
4 Sealing arrangement
5 Wheel support
5a Annular section
6 Hub
7 Protective sleeve
7a First section
7b Second section
8 Seal
9 Encoder
9a Encoding section
9b Support
9c Collar
9d Edge
9e Peak
9f Trough bottom
10 Rolling body
11 Inner ring
12 Raceway
13 Raceway
14 Raceway
15 Raceway
16 Wheel bolt
16a Projection
17 Sensor
18 Outer ring
19 Sealing gap
21 Encoder
21a Encoding section
21b Aperture
21c Web
21d Outer contour
22 Encoder
22a Encoding section
22b Outer contour
23 Sealing gap
25 Seal
26 Sealing lip
27 Sealing arrangement
28 Seal
29 Sealing lip
30 Sealing lip
31 Sealing lip
32 Disk section
33 Support
33a Collar
34 Sealing lip
35 Body

The invention claimed is:

1. A wheel bearing arrangement, comprising:
a hub having a rotational axis and a radial flange mounted about the rotational axis;
at least one non-rotating outer ring; and
at least one encoder being fixed on the hub where the radial flange leads radially away from the hub,
wherein the encoder surrounds an annular section of the outer ring in a circumferential manner radially on an outside face of the outer ring without contact, and
wherein the encoder is surrounded radially, without contact, by a protective sleeve, the protective sleeve having a first hollow-cylindrical section and a second hollow-cylindrical section, the first hollow-cylindrical section being connected integrally to the second hollow-cylindrical section by an additional section providing a space between the first hollow-cylindrical section and the second hollow-cylindrical section with the encoder being positioned in the space between the first hollow-cylindrical section and the second hollow-cylindrical section, the first hollow-cylindrical section being a radially outer most member and the second hollow-cylindrical section being radially inward relative to the first hollow-cylindrical section, and the second hollow-cylindrical section being fixed axially on the outside face of the outer ring.

2. The wheel bearing arrangement of claim 1, wherein the encoder engages over the annular section of the outer ring axially and in a same direction as the rotational axis of the wheel bearing arrangement.

3. The wheel bearing arrangement of claim 2, wherein the encoder is fixed to the hub by a support of the encoder, the support extending radially between the radial flange and the outer ring.

4. The wheel bearing arrangement of claim 1, wherein at least one inner ring of is seated on the hub.

5. The wheel bearing arrangement of claim 4, wherein the encoder is connected to the inner ring.

6. The wheel bearing arrangement of claim 1, wherein at least one raceway for at least one row of rolling bodies is formed directly on the hub.

7. The wheel bearing arrangement of claim 1, wherein the encoder is connected to a surface of the hub.

8. The wheel bearing arrangement of claim 1, wherein projections of fastening bolts project from the radial flange axially in a direction of the side of the radial flange which faces the wheel bearing arrangement, and wherein an encoding section of the encoder, which communicates with at least one sensor, is spaced radially from the projections and does not axially overlap the projections.

9. The wheel bearing arrangement of claim 8, wherein one of the projections which lies closest radially to the rotational axis is at a greater spacing from the rotational axis than the encoder protrudes radially from the rotational axis.

10. A wheel bearing arrangement, comprising:
a hub having a rotational axis and a radial flange;
at least one non-rotating outer ring having an annular section;
at least one sealing element; and
one encoder, the encoder being fixed on the hub where the radial flange radially leads away from the hub,
wherein the encoder surrounds the annular section of the outer ring in a circumferential manner radially on an outside face of the outer ring without contact, the encoder and the sealing element form a sealing operative connection, wherein the sealing operative connection is at least one gap seal between the encoder and the sealing element, the gap seal having at least one first sealing gap which extends around the rotational axis, and wherein the sealing element is a protective sleeve radially surrounding the encoder without contact, the protective sleeve having a first hollow-cylindrical section and a second hollow-cylindrical section, the first hollow-cylindrical section being connected integrally to the second hollow-cylindrical section by an additional section providing a space between the first hollow-cylindrical section and the second hollow-cylindrical section with the encoder being positioned in the space between the first hollow-cylindrical section and the second hollow-cylindrical section and the encoder extending axially along an entire length of the second hollow-cylindrical section, the first hollow-cylindrical section being a radially outer most member and the second hollow-cylindrical section being radially inward relative to the first hollow-cylindrical section, and the second hollow-cylindrical section being seated fixedly in an axial direction on the outside face of the annular section of the outer ring.

11. The wheel bearing arrangement of claim 10, wherein the at least one first sealing gap is smaller than 1 mm.

12. The wheel bearing arrangement of claim 10, wherein a smallest free distance between the protective sleeve and the encoder is formed by the at least one first sealing gap which extends around the rotational axis.

13. The wheel bearing arrangement of claim 12, further comprising a sealing operative connection between the protective sleeve and the radial flange.

14. The wheel bearing arrangement of claim 12, wherein the sealing operative connection is the at least one gap seal and a sealing contact between the encoder and at least one first sealing lip, the wheel bearing arrangement being sealed in the sealing operative connection first at the radial flange between the encoder and the at least one sealing element by the at least one first sealing gap externally against environmental influences, and then subsequently by the at least one first sealing lip, which follows the at least one sealing gap in the sealing operative connection.

15. The wheel bearing arrangement of claim 14, wherein the at least one first sealing lip bears sealingly against a disk-shaped support of the encoder.

16. The wheel bearing arrangement of claim 14, wherein a sealing operative connection is formed by a second gap seal having at least one second sealing gap between the protective sleeve and the radial flange.

17. The wheel bearing arrangement of claim 10, wherein a disk section is angled away from the second hollow-cylindrical section, and an elastic seal, which has at least one first sealing lip that is fixed on the disk section, the at least one first sealing lip bearing sealingly against a disk-shaped support of the encoder.

18. The wheel bearing arrangement of claim 17, wherein the seal has two first sealing lips.

19. The wheel bearing arrangement of claim 17, wherein the seal has a second sealing lip, the second sealing lip being prestressed sealingly towards the rotational axis of the wheel bearing arrangement.

20. The wheel bearing arrangement of claim 19, wherein the second sealing lip bears sealingly, in a radial manner, against at least one inner ring of the wheel bearing arrangement.

21. The wheel bearing arrangement of claim 19, wherein the second sealing lip bears sealingly in a radial manner against a surface of the hub.

22. The wheel bearing arrangement of claim 19, wherein an elastic third sealing lip is fixed on the protective sleeve, the third sealing lip bearing sealingly against the radial flange.

* * * * *